(12) United States Patent
Setiabudi

(10) Patent No.: US 8,852,382 B2
(45) Date of Patent: *Oct. 7, 2014

(54) THERMOSETTING COMPOSITION

(75) Inventor: Frans Setiabudi, Eschbach (DE)

(73) Assignee: Huntsman International LLC, The Woodlands, TX (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/525,936

(22) PCT Filed: Jan. 30, 2008

(86) PCT No.: PCT/EP2008/051085
§ 371 (c)(1),
(2), (4) Date: Aug. 5, 2009

(87) PCT Pub. No.: WO2008/095837
PCT Pub. Date: Aug. 14, 2008

(65) Prior Publication Data
US 2010/0015343 A1 Jan. 21, 2010

(30) Foreign Application Priority Data
Feb. 8, 2007 (EP) .................................... 07101986

(51) Int. Cl.
C04B 37/00 (2006.01)
B05D 3/02 (2006.01)
C08G 64/16 (2006.01)
C08L 69/00 (2006.01)
C08L 71/12 (2006.01)
C08G 73/02 (2006.01)
C08L 61/34 (2006.01)

(52) U.S. Cl.
CPC ............. *C08L 61/34* (2013.01); *C08G 73/0233* (2013.01)

USPC ................... 156/325; 427/385.5; 427/389.9; 524/611

(58) Field of Classification Search
USPC .............. 156/325; 427/385.5, 389.9; 524/611
See application file for complete search history.

(56) References Cited

U.S. PATENT DOCUMENTS

| 5,945,222 | A | 8/1999 | Nagase et al. |
|---|---|---|---|
| 6,207,786 | B1 | 3/2001 | Ishida et al. |
| 2003/0104156 | A1* | 6/2003 | Osada et al. .................. 428/40.1 |
| 2004/0076805 | A1 | 4/2004 | Oohori et al. |
| 2005/0131195 | A1* | 6/2005 | Asakage et al. ................ 528/95 |
| 2006/0008632 | A1 | 1/2006 | Oohori et al. |
| 2007/0129509 | A1* | 6/2007 | Li et al. .......................... 525/526 |
| 2007/0191555 | A1 | 8/2007 | Ishida et al. |

FOREIGN PATENT DOCUMENTS

| CN | 1451679 A | 10/2003 |
|---|---|---|
| EP | 0789056 | 8/1997 |
| EP | 1369456 | 12/2003 |
| JP | 2000327882 | 11/2000 |
| JP | 2001-220445 | 8/2001 |
| JP | 2003147165 | 5/2003 |
| WO | 00/27921 | 5/2000 |
| WO | 2005/100432 | 10/2005 |

* cited by examiner

Primary Examiner — Michael Orlando

(57) ABSTRACT

A thermosetting composition comprising (a) 97 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine; and (b) 3 to 60 percent by weight of at least one bisphenol, wherein the percent by weight refer to the total amount of components (a) and (b), with the proviso that (a) and (b) add up to 100 percent by weight; and (c) optionally other components. Cured products made from these compositions have valuable chemical, physical and mechanical properties.

14 Claims, No Drawings

THERMOSETTING COMPOSITION

CROSS REFERENCE TO RELATED APPLICATIONS

This application is the National Phase of International Application PCT/EP2008/051085 filed Jan. 30, 2008 which designated the U.S. and which claims priority to European Patent Application (EP) 07101986.3 filed Feb. 8, 2007. The noted applications are incorporated herein by reference.

TECHNICAL FIELD

This invention relates to thermosetting compositions which comprise (a) 97 to 40 percent by weight of one or more bis dihydrobenzoxazines on the basis of bisphenols, (b) 3 to 60 percent by weight of at least one bisphenol, and (c) optionally a curing catalyst. The invention also relates to the use of this composition for the manufacture of any materials with a cured resin of this thermosetting composition.

BACKGROUND OF THE INVENTION

Benzoxazine compounds have been employed satisfactorily to produce prepregs, laminates, moulding material, RTM (resin transfer moulding) systems, sealants, sinter powders, cast articles, structural composites parts, varnishes, surface coatings, electrical and electronic components by impregnating, coating, laminating or moulding processes. Such resins are dimension stable and have good electrical and mechanical resistance, low shrinkage, low water absorption, medium to high glass transition temperatures and good retaining properties, in term of mechanical properties.

Benzoxazine compounds can easily be produced in several, well known ways by the reaction of bisphenols with a primary amine and formaldehyde, whereby the process can be carried out in the presence of solvents (see for example U.S. Pat. No. 5,152,993 or U.S. Pat. No. 5,266,695) or in the absence of solvents (see for example U.S. Pat. No. 5,543,516). The common manufacture and various curing possibilities using hardeners such as novolacs, polyepoxides or polyamines optionally together with a catalyst, or the catalytical and/or thermal curing as well as the valuable properties of the resins make this class of thermosetting resins attractive.

EP 0 789 056 A2 describes a thermosetting resin composition with improved curability comprising dihydrobenzoxazines of polyphenols such as novolacs or bisphenol A and novolac phenolic resins. The composition is used as adhesives or for the manufacture of moulded articles, coatings, sealings, prepregs for printed wiring boards and metal-clad laminates with low water absorbance, improved none-flammability and high heat resistance. The use of polyhydroxy functional novolacs results in sometimes undesirable high reactivities (low gel times) and in higher cross-linked resins, which in general are more brittle.

WO 2006/035021 A1 describes bisbenzoxazines on the basis of phenolphthalein for the preparation of polymers, which show a high temperature stability and a good none-flammability. Polymerisation may be carried out in presence of catalytic amounts of catalysts, such as thiodipropionic acid, phenols or sulfonyl diphenol. The use of bisphenols as hardeners is not mentioned in WO 2006/035021 A1.

WO 00/27921 A1 discloses a ternary composition comprising 10 to 80 weight percent of a benzoxazine monomer, 10 to 80 weight percent of an epoxy reactant and 1 to 80 weight percent of a phenolic resin or phenolic compound. The use of bisphenols as hardeners for thermosetting compositions comprising bis(dihydrobenzoxazine) is not disclosed in WO 00/27921 A1.

SUMMARY OF THE INVENTION

It has now been surprisingly found that bisphenols are excellent hardeners for the polymerization of bis(dihydrobenzoxazine) compounds with improved reactivity and correspondingly lower gel times. It was further found that the additional combination with catalytic amounts of a protonic acid additionally increases the reactivity and further substantially shortens the gel time. It was also found that a composition comprising bis(dihydrobenzoxazine) compounds, bisphenols and optionally a catalyst such as a protonic acid possess an unusual high latency and storage stability regarding the increased reactivity. The admixed components can therefore be stored in one container and shipped to users, which is an economic advantage and much more comfortable for users. Additionally, the processability and control during moulding operations such as pressing is improved by the reduction of flow through the higher reactivity, which results in improved dimensional accuracy. The incorporation of the mere difunctional bisphenols in the polymer network results in thermosetting polymers, which show high temperature stability due to their unexpectedly high glass transition temperatures, good mechanical and also physical properties. Depending on the selection of monomers, even a reduced combustibility can be achieved.

DETAILED DESCRIPTION OF THE INVENTION

A first object of the invention is a thermosetting composition comprising
(a) 97 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine; and
(b) 3 to 60 percent by weight of at least one bisphenol selected from hydrochinone, resorcinol, catechol, or from bisphenols of formula II,

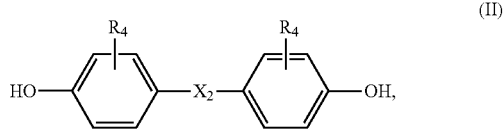

(II)

wherein
$R_4$ is hydrogen, dialkylamino; alkylthio; alkylsulfonyl; $C_1$-$C_{18}$alkyl; $C_1$-$C_{18}$alkoxy; $C_1$-$C_{18}$alkoxyalkyl; $C_5$-$C_{12}$cycloalkyl that is unsubstituted or substituted by one or more $C_1$-$C_6$alkyl groups or $C_1$-$C_6$alkoxy groups; $C_6$-$C_{12}$aryl that is unsubstituted or substituted by one or more $C_1$-$C_6$alkyl groups or $C_1$-$C_6$alkoxy groups; or $C_7$-$C_{13}$aralkyl that is unsubstituted or substituted by one or more $C_1$-$C_6$alkyl groups or $C_1$-$C_6$alkoxy groups;
$X_2$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$) O—, —(O)P(OR$_3$)—, —P(OR$_3$)—, —P(R$_3$)—, —O—(O)P(R$_3$)—O—, C$_1$-C$_{18}$alkylen, C$_2$-C$_{18}$alkyliden, C$_3$-C$_{12}$cycloalkyliden, —Si(OR$_3$)$_2$— and —Si(R$_3$)$_2$—; and R$_3$ is H or C$_1$-C$_{12}$alkyl, C$_5$- or C$_6$-cycloalkyl, C$_5$- or C$_6$-cycloalkyl-methyl or -ethyl, phenyl, benzyl or 1-phenyleth-2-yl, wherein the percent by weight refer to the total amount of components (a) and (b) with the proviso that (a) and (b) add up to 100%; and (c) optionally other components.

Preferably, the thermosetting composition additionally comprises
c) of a curing catalyst, preferably of a protonic acid curing catalyst.

In a preferred embodiment, the composition according to the invention comprises
(a) 95 to 50, preferably 95 to 60 and more preferably 94 to 70 percent by weight of at least one bis(dihydrobenzoxazine), and
(b) 5 to 50, preferably 5 to 40 and more preferably 6 to 30 percent by weight of at least one bisphenol.

It was found that cured resins with a lower content of bisphenols possess higher glass transition temperatures and thermostability, respectively. Such a thermosetting compositions in addition have a sufficiently high reactivity. Therefore, in a further preferred embodiment, the composition according to the invention comprises
(a) 97 to 75, preferably 96 to 80, more preferably 95 to 80 and most preferably 94 to 85 percent by weight of at least one bis(dihydrobenzoxazine); and
(b) 3 to 25, preferably 4 to 20, more preferably 5 to 20 and most preferably 6 to 15 percent by weight of at least one bisphenol.

The composition according to the invention is cured at high temperatures such as above 130° C. Curing catalysts are useful therefore to accelerate the curing process. These are preferably incorporated in low levels in order to avoid formation of volatile decomposition products which would effect the properties of the thermosetting plastics. The amount of curing catalyst is preferably at most 5, further preferred 0.001 to 4, more preferably 0.01 to 3, especially preferred 0.1 to 2 and in particular 0.1 to 1.5 percent by weight, based on the amount of components (a), and (b).

Curing catalysts, which accelerate the curing rate at a given temperature are well known and may be selected from metal salts and metal complexes, which may act as Lewis acids. Such salts and complex compounds are described for example in EP-A-0 149 987 and include for example iron(II)- or iron-(II)-chloride or -bromide, fluorides, chlorides and bromides of zinc, tin, zirconium, aluminium and boron, carboxylic acid salts of copper, cobalt, nickel, manganese, lead, zinc, tin and iron, carbonyls of nickel, iron, molybdenum and cobalt, and acetyl acetonates of iron, cobalt, nickel and cobalt. Some specific examples are zinc octoate, dibutyltin diacetate, copper(II)-acetate, and zirconium dioctoate.

Preferred curing catalysts are protonic acids, especially aliphatic or aromatic mono- or polycarboxylic acids, sulfonic acids and phosphonic acids, having 1 to 20 and preferably 2 to 12 carbon atoms. The aliphatic and aromatic residues linking the carboxylic groups may contain hetero atoms and groups such as O, S, —N=, —NH— and —N(C$_1$-C$_4$alkyl)-. The aliphatic and aromatic residues may be unsubstituted or substituted with one or more C$_1$-C$_6$alkyl, C$_1$-C$_6$hydroxyalkyl or C$_1$-C$_6$alkoxy groups, halogen (F or Cl), hydroxyl or amino. Preferred substituents are C$_1$-C$_4$alkyl, C$_1$-C$_4$hydroxyalkyl or C$_1$-C$_4$alkoxy groups, F or Cl. The carboxylic acid may contain preferably 1 to 4 and more preferably 1 or 2 carboxylic groups. The aliphatic or aromatic residue can be selected from alkanes, alkenes, cycloalkanes, heterocycloalkanes, cycloalkenes, heterocycloalkenes, carbocyclic or heterocyclic aromates, such as C$_1$-C$_{18}$alkyl, C$_1$-C$_{18}$alkenyl, C$_3$-C$_{12}$cycloalkyl, C$_3$-C$_{12}$heterocycloalkyl, C$_6$-C$_{18}$aryl, C$_6$-C$_{18}$heteroaryl. A preferred group of carboxylic acids is selected from those of formulae X$_2$—C$_n$H$_{2n}$—COOH and X$_2$—C$_6$-C$_{10}$arylen-COOH, wherein X$_2$ is hydrogen or the group —COOH, and n is a number of 1 to 12, preferably 1 to 6.

Some preferred examples for carboxylic acids are acetic acid, propanoic acid, butanoic acid, octanoic acid, dodecanoic acid, octanoic acid, maleic acid, succinic acid, nonyl- or dodecyl-succinic acid, glutaric acid, adipic acid, pimelic acid, suberic acid, azelaic acid, benzoic acid, phthalic acid, isophthalic acid, terephthalic acid and naphthalene dicarboxylic acid. Other examples are methyl sulfonic acid, trifluoromethyl sulfonic acid, phenyl sulfonic acid, toluoyl sulfonic acid, methyl phosphonic acid and phenyl phosphonic acid.

An especially preferred curing catalyst is adipic acid.

Bis(dihydrobenzoxazines) on the basis of bisphenols are well known, commercially available and can be prepared according to well known and published methods. Bis(dihydrobenzoxazines) on the basis of bisphenols may correspond to formula I,

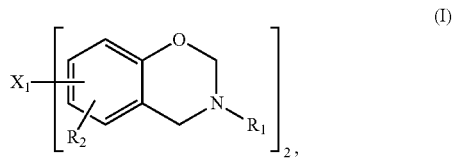

(I)

wherein
R$_1$ is C$_1$-C$_{18}$alkyl, or C$_3$-C$_{12}$cycloalkyl, C$_3$-C$_{12}$cycloalkyl-C$_1$-C$_4$alkyl, C$_6$-C$_{18}$aryl or C$_6$-C$_{18}$aryl-C$_1$-C$_4$alkyl, which are unsubstituted or substituted by one or more C$_1$-C$_6$alkyl groups or C$_1$-C$_6$alkoxy groups;
R$_2$ hydrogen, dialkylamino; alkylthio; alkylsulfonyl; C$_1$-C$_{18}$alkyl; C$_1$-C$_{18}$alkoxy; C$_1$-C$_{18}$alkoxyalkyl; C$_5$-C$_{12}$cycloalkyl that is unsubstituted or substituted by one or more C$_1$-C$_6$alkyl groups or C$_1$-C$_6$alkoxy groups; C$_6$-C$_{12}$aryl that is unsubstituted or substituted by one or more C$_1$-C$_6$alkyl groups or C$_1$-C$_6$alkoxy groups; or C$_7$-C$_{13}$aralkyl that is unsubstituted or substituted by one or more C$_1$-C$_6$alkyl groups or C$_1$-C$_6$alkoxy groups;
X$_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, C$_1$-C$_{18}$alkylen, C$_2$-C$_{18}$alkyliden, C$_3$-C$_{12}$cycloalkylen or -cycloalkyliden, —Si(OR$_3$)$_2$— and —Si(R$_3$)$_2$—; and
R$_3$ is H or C$_1$-C$_{12}$alkyl, C$_5$- or C$_6$-cycloalkyl, C$_5$- or C$_6$-cycloalkyl-methyl or -ethyl, phenyl, benzyl or 1-phenyleth-2-yl.

When the radicals R$_1$ to R$_3$ are alkyl, alkoxy or alkoxyalkyl, those alkoyl or alkoxy radicals can be straight-chained or branched and may contain 1 to 12, more preferably 1 to 8 and most preferably 1 to 4 C atoms.

Examples of alkyl groups are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl and octadecyl groups.

Suitable alkoxy groups are, for example, methoxy, ethoxy, isopropoxy, n-propoxy, n-butoxy, isobutoxy, sec-butoxy, tert-butoxy and the various isomeric pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy groups.

Examples of alkoxyalkyl groups are 2-methoxyethyl, 2-ethoxyethyl, 2-methoxypropyl, 3-methoxypropyl, 4-methoxybutyl and 4-ethoxybutyl.

Cycloalkyl is preferably $C_5$-$C_8$cycloalkyl, especially $C_5$- or $C_6$-cycloalkyl. Some examples thereof are cyclopentyl, methylcyclopentyl, cyclohexyl, cycloheptyl and cyclooctyl.

Aryl groups are, for example, phenyl, naphthyl and anthryl.

Aralkyl preferably contains from 7 to 12 carbon atoms and especially from 7 to 11 carbon atoms. It may be, for example, benzyl, phenethyl, 3-phenylpropyl, α-methylbenzyl, 4-phenylbutyl or α,α-dimethylbenzyl.

$R_1$ is preferably $C_1$-$C_{12}$alkyl, $C_5$-$C_8$cycloalkyl or $C_5$-$C_8$cycloalkyl-$C_1$-$C_2$alkyl that is unsubstituted or substituted by one or more $C_1$-$C_4$alkyl groups or $C_1$-$C_4$alkoxy groups, $C_6$-$C_{10}$aryl or $C_6$-$C_{10}$aryl-$C_1$-$C_2$alkyl that is unsubstituted or substituted by one or more $C_1$-$C_4$alkyl groups or $C_1$-$C_4$alkoxy groups.

In a more preferred embodiment of the present invention, $R_1$ is $C_1$-$C_6$alkyl, or phenyl or benzyl—both unsubstituted or substituted by one or more methyl groups or methoxy groups.

According to the invention, compounds of formula I are preferred, in which $R_1$ is isopropyl, iso- or tertiary-butyl, n-pentyl or phenyl.

$R_2$ in the compounds of formula I is preferably hydrogen.

Cycloalkylen $X_1$ may be a polycycloalkylen having 2 to 4 condensed and/or bridged carbon cycles such as bicyclo-[2,2,1]-heptanylene or tricyclo-[2,1,0]-decanylene.

$X_1$ is preferably a direct bond or more preferably a bivalent bridging group selected from —O—, —S—, —S(O)—, —S(O)$_2$—, —C(O)—, —P(O)(OR$_3$)O—, —OP(OR$_3$)O—, —OP(OR$_3$)—, —P(OR$_3$)—, —P(R$_3$)—, $C_1$-$C_2$-alkylen, and $C_1$-$C_{12}$alkyliden, wherein $R_3$ $C_1$-$C_4$alkyl, $C_5$- or $C_6$-cycloalkyl, phenyl or benzyl.

It was found that S and P containing bridging groups improve flammability resistance and these groups may be selected if said resistance is desired.

$R_3$ is preferably H, $C_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl. If $R_3$ is part of the groups P(O)(OR$_3$)O—, —OP(OR$_3$)O—, —OP(OR$_3$)—, —P(OR$_3$)— and —P(R$_3$), then it is preferably not hydrogen.

In a preferred embodiment, $R_3$ is selected from $C_1$-$C_4$alkyl, cyclohexyl, phenyl or benzyl.

Some preferred examples of bisphenols used to prepare bis(dihydrobenzoxazines) are 4,4'-dihydroxybiphenyl, (4-hydroxyphenyl)$_2$C(O) (DHBP), bi(4-hydroxyphenyl) ether, bi(4-hydroxyphenyl)thioether, bisphenol A, bisphenol AP, bisphenol E, bisphenol H, bisphenol F, bisphenol S, bisphenol Z, phenolphthalein and bi(4-hydroxyphenyl)tricyclo-[2,1,0]-decan.

The bisphenol component (b) may be selected from hydrochinone, resorcinol, catechol, or from bisphenols of formula II,

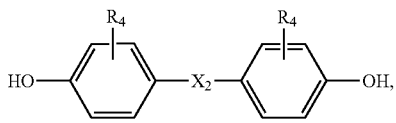

wherein $R_4$ is hydrogen, dialkylamino; alkylthio; alkylsulfonyl; $C_1$-$C_{18}$alkyl; $C_1$-$C_{18}$alkoxy; $C_1$-$C_{18}$alkoxyalkyl; $C_5$-$C_{12}$cycloalkyl that is unsubstituted or substituted by one or more $C_1$-$C_6$alkyl groups or $C_1$-$C_6$alkoxy groups; $C_6$-$C_{12}$aryl that is unsubstituted or substituted by one or more $C_1$-$C_6$alkyl groups or $C_1$-$C_6$alkoxy groups; or $C_7$-$C_{13}$aralkyl that is unsubstituted or -substituted by one or more $C_1$-$C_6$alkyl groups or $C_1$-$C_6$alkoxy groups;

$X_2$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_1$-$C_{18}$alkylen, $C_2$-$C_{18}$alkyliden, $C_3$-$C_{12}$cycloalkyliden, —Si(OR$_3$)$_2$— and —Si(R$_3$)$_2$—; and $R_3$ is H or $C_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl.

$R_3$ in formula II may independently have the same preferred meanings as $R_3$ in formula I.

$R_4$ in formula II may independently have the same preferred meanings as $R_2$ in formula I. $R_4$ is in particular hydrogen or $C_1$-$C_4$alkyl, such as methyl or ethyl $X_2$ preferably is a direct bond or a bivalent bridging group selected from —O—, —S—, —S(O)$_2$—, —C(O)—, —NR$_3$, $C_1$-$C_4$alkylen (for example methylene or 1,2-ethylene), $C_2$-$C_6$alkyliden (for example ethylidene, 1,1- or 2,2-propylidene, 1,1- or 2,2-butylidene, 1,1-, 2,2- or 3,3-pentylidene, or 1,1-, 2,2- or 3,3-hexylidene) or $C_5$-$C_8$cycloalkyliden (cyclopentylidene, cyclohexylidene or cyclooctylidene), whereby $R_3$ is preferably hydrogen or $C_1$-$C_4$alkyl.

If an improved flammability resistance is desired, $X_2$ is a bivalent bridging group selected from —S—, and —S(O)$_2$—.

Preferred bisphenols of formula II are 4,4'dihydroxy-biphenyl, (4-hydroxyphenyl)$_2$C(O) (DHBP), bi(4-hydroxyphenyl)ether, bi(4-hydroxyphenyl)thioether, bisphenol A, bisphenol AP, bisphenol E, bisphenol H, bisphenol F, bisphenol S and bisphenol Z. Bisphenols with sulfur containing bridging groups may be selected if improvement of high flammability resistance is desired.

The properties of the thermosetting resins can be tailored for certain applications by addition of usual additives. The following additives are of particular importance:

reinforcement fibers, such as glass, quartz, carbon, mineral and synthetic fibers (Keflar, Nomex), natural fibres, such as flax, jute, sisal, hemp in the usual forms of short fibers, staple fibers, threads, fabrics or mats;

plasticizers, especially phosphorus compounds;

mineral fillers, such as oxides, carbides, nitrides, silicates and salts, e.g. quartz powder, fused silica, aluminium oxide, glass powder, mica, kaolin, dolomite, carbon black or graphite;

pigments and dyestuffs;

micro hollow spheres;

metal powders;

flame retardants;

defoaming agents;
slip agents;
thixotropes;
adhesion promoters; and
mould release agents.

It was also surprisingly found that the presence of aromatic polyamines, e.g. bisphenyldiamines such as 4,4'-diaminodiphenylsulfone or methylene bisaniline, in the thermosetting resin composition improves the adhesion of the cured resin to metallic surfaces, such as copper surfaces. Therefore, in a further preferred embodiment of the invention, aromatic polyamines are present. The amount of these may range from 0.01 to 5 percent by weight, preferably 0.1 to 3 percent by weight, and especially preferred 0.5 to 2 percent by weight, based on the total amount of components (a) and (b). Preferably, 4,4'-diaminodiphenylsulfone is used.

The thermosetting composition according to the invention can also comprise a solvent or a solvent mixture, especially when it is used as laminating or surface coating composition. Examples of solvents that are particularly suitable include methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycols, glycol acetates and toluene, xylene. The ketones and the glycols are especially preferred. Typically, the laminating composition will contain 20 to 30% by weight, preferably 30% by weight, of a solvent.

The thermosetting composition according to the invention can be cured or pre-cured at temperatures of about 130 to 240° C., preferably 150 to 220° C. and in particular 160 to 200° C. for the manufacture of prepregs, laminates or hot melting moulding processes.

The thermosetting composition according to the invention can be used for example for the manufacture of composites from prepregs or B stage resins, and RTM (resin transfer moulding) systems.

The thermosetting compositions according to the invention can be used, for example, as solvent-free casting resins, surface coating resins, laminating resins, moulding resins, potting resins, encapsulating resins and adhesives to produce moulded or coated articles or composites for the electrical and electronic industry, in the automotive and aerospace industry, or for surface protection of many articles, e.g. pipes and pipelines.

Curing of the composition and an impregnation and lamination process is explained in the following:
(1) A benzoxazin-containing formulation is applied to or impregnated into a substrate by rolling, dipping, spraying, other known techniques and/or combinations thereof. The substrate is typically a woven or nonwoven fiber mat containing, for instance, glass fibers, carbon or mineral fibers or paper.
(2) The impregnated substrate is "B-staged" by heating at a temperature sufficient to evaporate solvent (if the latter is present) in the benzoxazin formulation and to partially cure the benzoxazin formulation, so that the impregnated substrate can be handled easily. The "B-staging" step is usually carried out at a temperature of from 80° C. to 220° C. and for a time of from 1 minute to 15 minutes. The impregnated substrate that results from "B-staging" is called a "prepreg". The temperature is most commonly 100° C. for composites and 130° C. to 200° C. for electrical laminates.
(3) One or more sheets of prepreg are stacked on top of each other or may alternate with one or more sheets of a conductive material, such as copper foil, if an electrical laminate is desired.
(4) The laid-up sheets are pressed at high temperature and pressure for a time sufficient to cure the resin and form a laminate. The temperature of this lamination step is usually between 100° C. and 240° C., and is most often between 165° C. and 190° C. The lamination step may also be carried out in two or more stages, such as a first stage between 100° C. and 150° C. and a second stage at between 165° C. and 190° C. The pressure is usually from 50 N/cm$^2$ and 500 N/cm$^2$. The lamination step is usually carried out for a time of from 1 minute to 200 minutes, and most often for 45 minutes to 90 minutes. The lamination step may optionally be carried out at higher temperatures for shorter times (such as in continuous lamination processes) or for longer times at lower temperatures (such as in low energy press processes).
(5) Optionally, the resulting laminate, for example, a copper-clad laminate, may be post-treated by heating for a time at high temperature and ambient pressure. The temperature of post-treatment is usually between 120° C. and 250° C. The post-treatment time usually is between 30 minutes and 12 hours.

Solid substrates for coating purposes may be selected from metal, metal alloys, wood, glass, minerals such as silicates, corundum or boron nitride, and plastics.

The cured resins possess a high chemical resistance, corrosion resistance, mechanical resistance, durability, hardness, toughness, flexibility, temperature resistance or stability (high glass transition temperatures), reduced combustibility, adhesion to substrates and de-lamination resistance.

Another object of the invention relates to the use of the thermosetting composition according to the invention for the manufacture of moulded articles, surface coatings, composites and laminates.

A further object of the invention are cured products manufactured from the thermosetting composition according to the invention.

EXAMPLES

The following examples explain the invention.

A) Preparation of Thermosetting Compositions

Example A1 to 10

A solid mixture of (in parts by weight) component (a) benzoxazine, component (b) bisphenol and optionally curing catalyst (c) is molten at 130-140° C. under thorough stirring. The gel time of such homogenous mixture is measured on a hot plate at 180° C. The gel time has been determined according to the standard test method IPC-TM-650-2.3.18, however, the measurement has been carried out on a hot plate of 180° C. instead of 171° C. The mixture is cured in an oven at 200° C. for 90 minutes. The onset temperature (onset T), temperature peak (T peak), enthalpie and glass transition temperature (Tg) has been determined on a DSC machine of Mettler type DSC 823 (condition: from 30 to 350° C., heating rate 20° C./min).

The results are given in the following Tables 1 and 2.

TABLE 1

|  | A1 | A2 | A3 | A4 | A5 | A6 |
|---|---|---|---|---|---|---|
| bisphenol F benzoxazine |  |  | 10 | 10 | 10 | 10 |
| phenolphthalein benzoxazine |  | 10 |  |  |  |  |
| bisphenol A benzoxazine | 10 |  |  |  |  |  |
| 4,4'-dihydroxydiphenylsulfone | 1 | 1 | 1 | 0.4 | 0.4 | 1.2 |

TABLE 1-continued

|  | A1 | A2 | A3 | A4 | A5 | A6 |
|---|---|---|---|---|---|---|
| bisphenol A |  |  |  |  |  |  |
| adipic acid |  |  |  |  | 0.56 |  |
| benzoic acid |  |  |  |  |  |  |
| gel time/180° C. (sec) | 455 | 323 | 430 | 1140 | 148 | 317 |
| DSC 30-350° C., 20° C./min |  |  |  |  |  |  |
| onset T (° C.) | 195 | 192 | 204 | 220 | 176 | 188 |
| T peak (° C.) | 226 | 229 | 233 | 240 | 208 | 215 |
| enthalpie (J/g) | 243 | 171 | 224 | 228 | 225 | 243 |
| $T_g$ after 90 min/200° C. | 185 | 215 | 179 | 169 | 183 | 179 |

TABLE 2

|  | A7 | A8 | A9 | A10 | C1 | C2 |
|---|---|---|---|---|---|---|
| bisphenol F benzoxazine | 10 | 10 | 10 |  | 10 |  |
| phenolphthalein benzoxazine |  |  |  |  |  | 10 |
| bisphenol A benzoxazine |  |  |  | 10 |  |  |
| 4,4'-dihydroxy-diphenylsulfone | 1.2 | 0.4 |  |  |  |  |
| bisphenol A |  |  | 0.40 | 2 |  |  |
| phenol-formaldehyde novolac[a] |  |  |  |  |  | 1 |
| adipic acid | 0.1 |  |  |  |  |  |
| benzoic acid |  | 0.1 |  |  |  |  |
| gel time/180° C. (sec) | 250 | 311 | 973 | 511 | 2040 | 720 |
| DSC 30-350° C., 20° C./min |  |  |  |  |  |  |
| onset (° C.) | 185 | 186 | 218 | 192 | 240 | 196 |
| T peak (° C.) | 212 | 208 | 236 | 218 | 254 | 236 |
| enthalpy (J/g) | 254 | 267 | 274 | 272 | 290 | 204 |
| $T_g$ after 90 min/200° C. | 185 | 162 | 163 | 157 |  |  |

[a] = DURITE ® SD-1702 ex Borden Chemical, Inc.; viscosity at 150° C.: 1400-2400 cps; Mw: 2500; Mn: 600

Remarks: The examples (A1 to A10) according to the invention summarized in Tables 1 and 2 demonstrate enhanced reaction (shorter gel times) when a protonic acid catalyst is used in addition (A5 and A7). Unusual high glass transition temperatures result, especially when dicarboxylic acids such as adipic acid are used as catalysts.

The benzoxazines used correspond to formula

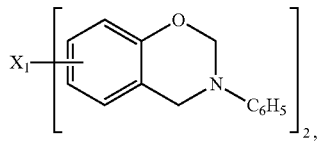

wherein $X_1$ is —$CH_2$— (bisphenol F benzoxazine), 2,2-propylidene (bisphenol A benzoxazine) or 1(3H)-isobenzofuranone-3,3'-ylidene.

C1 and C2 are comparative examples. The comparison of C2 with A2 clearly demonstrate a lower gel time and a higher reactivity (lower T peak) for example A2 according to the invention relative to comparative example C2.

The invention claimed is:

1. A thermosetting composition consisting of:
   (a) 97 to 75 percent by weight of at least one bis(dihydrobenzoxazine) prepared by the reaction of an unsubstituted or substituted bisphenol with at least one unsubstituted position ortho to each hydroxyl group, formaldehyde and a primary amine; and
   (b) 3 to 25 percent by weight of at least one bisphenol selected from hydrochinone, resorcinol, catechol and a bisphenol of formula II,

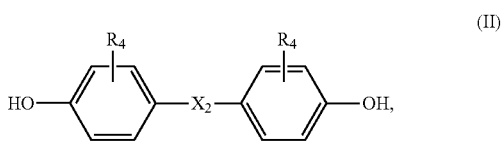

wherein
$R_4$ is hydrogen, dialkylamino; alkylthio; alkylsulfonyl; $C_1$-$C_{18}$ alkyl; $C_1$-$C_{18}$ alkoxy; $C_1$-$C_{18}$ alkoxyalkyl; $C_5$-$C_{12}$ cycloalkyl that is unsubstituted or substituted by one or more $C_1$-$C_6$ alkyl groups or $C_1$-$C_6$ alkoxy groups; $C_6$-$C_{12}$ aryl that is unsubstituted or substituted by one or more $C_1$-$C_6$ alkyl groups or $C_1$-$C_6$ alkoxy groups; or $C_7$-$C_{13}$ aralkyl that is unsubstituted or substituted by one or more $C_1$-$C_6$ alkyl groups or $C_1$-$C_6$ alkoxy groups;

$X_2$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_2$-$C_{18}$ alkyliden, $C_3$-$C_{12}$ cycloalkyliden, —Si(OR$_3$)$_2$— and —Si(R$_3$)$_2$—; and $R_3$ is H or $C_1$-$C_{12}$ alkyl, $C_5$- or $C_6$-cycloalkyl, $C_5$- or $C_6$-cycloalkyl-methyl or -ethyl, phenyl, benzyl or 1-phenyleth-2-yl (c) 0.01 to 3 percent by weight of a proton acid curing catalyst selected from an aliphatic monocarboxylic acid, an aromatic monocarboxylic acid, an aliphatic sulfonic acid, an aromatic sulfonic acid, an aliphatic phosphonic acid an aromatic phosphoric acid and a mixture thereof; and optionally (d) at least one of an aromatic amine, a solvent or an additive selected from reinforcement fibers, synthetic fibers, natural fibers, staple fibers, threads, fabrics, mats, plasticizers, mineral fillers, pigments, dyestuffs, micro hollow spheres, metal powders, flame retardants, defoaming agents, slip agents, thixotropes, adhesion promoters, mould release agents and a mixture thereof.

2. A thermosetting composition according to claim 1 which comprises as component (a) bis(dihydrobenzoxazines) of formula I,

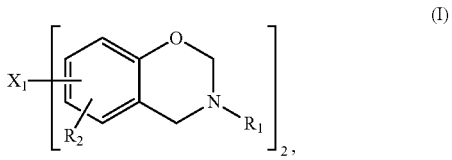

wherein
$R_1$ is $C_1$-$C_{18}$ alkyl, or $C_3$-$C_{12}$ cycloalkyl, $C_3$-$C_{12}$ cycloalkyl-$C_1$-$C_4$ alkyl, $C_6$-$C_{18}$ aryl or $C_6$-$C_{18}$ aryl-$C_1$-$C_4$ alkyl, which are unsubstituted or substituted by one or more $C_1$-$C_6$ alkyl groups or $C_1$-$C_6$ alkoxy groups;
$R_2$ is hydrogen, dialkylamino; alkylthio; alkylsulfonyl; $C_1$-$C_{18}$ alkyl; $C_1$-$C_{18}$ alkoxy; $C_1$-$C_{18}$ alkoxyalkyl;

$C_5$-$C_{12}$ cycloalkyl that is unsubstituted or substituted by one or more $C_1$-$C_6$ alkyl groups or $C_1$-$C_6$ alkoxy groups; $C_6$-$C_{12}$ aryl that is unsubstituted or substituted by one or more $C_1$-$C_6$ alkyl groups or $C_1$-$C_6$ alkoxy groups; or $C_7$-$C_{13}$ aralkyl that is unsubstituted or substituted by one or more $C_1$-$C_6$ alkyl groups or $C_1$-$C_6$ alkoxy groups;

$X_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_1$-$C_{18}$ alkylen, $C_2$-$C_{18}$ alkyliden, $C_3$-$C_{12}$ cycloalkyliden, —Si(OR$_3$)$_2$— and —Si(R$_3$)$_2$—; and $R_3$ is H or $C_1$-$C_{12}$ alkyl, $C_5$- or $C_6$-cycloalkyl, $C_5$- or $C_6$-cycloalkyl-methyl or -ethyl, phenyl, benzyl or 1-phenyleth-2-yl.

3. A thermosetting composition according to claim 2, wherein $R_1$ is $C_1$-$C_6$ alkyl, or phenyl or benzyl that is unsubstituted or substituted by one or more methyl groups or methoxy groups.

4. A thermosetting composition according to claim 2 wherein $R_2$ in the compound of formula I is hydrogen.

5. A thermosetting composition according to claim 2 wherein $X_1$ is a direct bond or a bivalent bridging group selected from —O—, —S—, —S(O)—, —S(O)$_2$—, —P(O)(OR$_3$)O—, —OP(OR$_3$)O—, —OP(OR$_3$)—, —P(OR$_3$)—, $C_1$-$C_2$ alkylen, and $C_1$-$C_{12}$ alkyliden, and wherein $R_3$ is $C_1$-$C_4$ alkyl, $C_5$- or $C_6$-cycloalkyl, phenyl or benzyl.

6. A thermosetting composition according to claim 2 wherein $R_3$ is H, $C_1$-$C_{12}$ alkyl, $C_5$- or $C_6$-cycloalkyl, $C_5$- or $C_6$-cycloalkyl-methyl or -ethyl, phenyl, benzyl or 1-phenyleth-2-yl, with the proviso that if $R_3$ is in the groups —P(O)(OR$_3$)O—, —OP(OR$_3$)O—, —OP(OR$_3$)—, —P(OR$_3$)— and —P(R$_3$)— then it is not hydrogen.

7. A thermosetting composition according to claim 1 wherein in formula (II) $R_4$ is hydrogen or $C_1$-$C_4$ alkyl.

8. A thermosetting composition according to claim 1 wherein in formula (II) $X_2$ is a bivalent bridging group selected from —S—, and —S(O)$_2$—.

9. A thermosetting composition according to claim 1 wherein an aromatic polyamine is present.

10. A method of forming a laminate comprising:
(a) applying the thermosetting composition of claim 1 to a substrate;
(b) heating the substrate to partially cure the thermosetting composition and form a prepeg;
(c) optionally repeating steps (a) and (b);
(d) stacking one or more sheets of prepeg on top of each other; and
(e) pressing the stacked sheets at a temperature of between 100° C. to 240° C. and a pressure of between 50 N/cm$^2$ to 500 N/cm$^2$ to form the laminate.

11. The method of claim 10, wherein the substrate is a woven or nonwoven fiber mat.

12. A method of coating a substrate comprising applying the thermosetting composition of claim 1 to the surface of the substrate.

13. The method of claim 12, wherein the substrate is a metal, a metal alloy, wood, glass, a mineral or plastic.

14. A cured product produced by curing the thermosetting composition of claim 1.

* * * * *